United States Patent [19]

Pavlidis

[11] Patent Number: 5,566,255
[45] Date of Patent: Oct. 15, 1996

[54] SEGMENTING A PAGE OF A DOCUMENT INTO AREAS WHICH ARE TEXT AND AREAS WHICH ARE HALFTONE

[75] Inventor: Theo Pavlidis, Setauket, N.Y.

[73] Assignee: Ricoh Company, Ltd., Tokyo, Japan

[21] Appl. No.: 447,841

[22] Filed: May 23, 1995

Related U.S. Application Data

[63] Continuation of Ser. No. 138,719, Oct. 18, 1993, abandoned, which is a continuation of Ser. No. 664,925, Mar. 5, 1991, abandoned.

[51] Int. Cl.$^6$ .................................................. G06K 9/20
[52] U.S. Cl. ............................................................. 382/317
[58] Field of Search .................................. 382/173, 317; 358/429, 453, 455, 462, 470

[56] References Cited

U.S. PATENT DOCUMENTS

| | | | |
|---|---|---|---|
| 4,403,257 | 9/1983 | Hsieh | 358/462 |
| 4,409,623 | 10/1983 | Kobayashi et al. | 358/455 |
| 4,447,830 | 5/1984 | Stoffel | 358/462 |
| 4,503,556 | 3/1985 | Scherl et al. | 358/462 |
| 4,559,563 | 12/1985 | Joiner, Jr. | 358/429 |
| 4,577,235 | 3/1986 | Kannapell et al. | 358/462 |
| 4,899,225 | 2/1990 | Sasuga et al. | 358/462 |
| 4,949,392 | 8/1990 | Barski et al. | 358/467 |
| 5,048,107 | 9/1991 | Tachikawa | 358/462 |
| 5,073,953 | 12/1991 | Westdijk | 358/462 |
| 5,134,666 | 7/1992 | Imao et al. | 358/466 |

OTHER PUBLICATIONS

Pavlidis, T., A Vectorizer And Feature Extractor For Document Recognition, Computer Vision, Graphics, and Image Processing 35, 111–127 (1986).

Kahan, S. et al., On The Recognition Of Printed Characters Of Any Font And Size, IEEE Transactions on Pattern Analysis and Machine Intelligence, vol. PAMI-9, No. 2, Mar. 1987, pp. 274–288.

Johnston, E. G., Short Note Printed Text Discrimination, Computer Graphics and Image Processing (1974) 3, (83–89).

Wahl, M. et al., Block Segmentation And Text Extraction In Mixed Text/Image Documents, Computer Vision, Graphics, and Image Processing, Academic Press, 1982, pp. 375–390.

Baird, H. et al., Image Segmentation By Shape-Directed Covers, IEEE Proc., 10th ICPR, Atlantic City, NJ, pp. 820–825, Jun. 1990.

Hinds, S.C. et al., A Document Skew Detection Method Using Run Length Encoding And The Hough Transformation, IEEE Proc. 10th ICPR, Atlantic City, NJ, pp. 464–468, Jun. 1990.

Primary Examiner—Jose L. Couso
Attorney, Agent, or Firm—Cooper & Dunham LLP

[57] ABSTRACT

Page segmentation which scans a document to detect black and white run lengths along scanlines, finds grey intervals each defined as being between two long white or mostly white intervals of a scanline or between an end of the scanline and a long (mostly) white interval, links adjacent grey intervals into grey areas, and identifies such grey areas as text or halftone, prior to a larger process such as character recognition.

8 Claims, 6 Drawing Sheets

SEGMENTING A PAGE OF A DOCUMENT INTO AREAS WHICH ARE TEXT AND AREAS WHICH ARE HALFTONE

This is a continuation of application Ser. No. 08/138,719 filed Oct. 18, 1993 now abandoned, which in turn is a continuation of application Ser. No. 07/664,925 filed Mar. 5, 1991 now abandoned.

BACKGROUND AND SUMMARY OF THE INVENTION

The invention is in the field of processing documents and, more specifically, processing for the purpose of identifying areas on a document as text, halftone, graphics, etc. Such processing is sometimes called page segmentation and can be a part of a larger process or system such as character recognition or data compression.

Page segmentation can be a desirable pre-processing step in document analysis systems. For example, Wahl, M., et al., BLOCK SEGMENTATION AND TEXT EXTRACTION IN MIXED TEXT/IMAGE DOCUMENTS, Computer Vision, Graphics, and Image Processing, Academic Press, 1982, pp. 375–390 discuss a constrained run length algorithm (CRLA) for partitioning documents into areas of text lines, solid black lines and rectangular boxes enclosing graphics and half-tone images, and state that the proposed process labels these areas and calculates meaningful features. The paper discusses a linear adaptive classification scheme which makes use of the regular appearance of text lines as textured stripes in order to distinguish text regions from other regions. Additional material in this field is cited under the heading References at page 390. The CRLA discussed by Wahl, M., et al. carries out a bi-level digitization of scanlines into 0's and 1's and then replaces 0's with 1's if the number of adjacent 0's is less than or equal to a predetermined constraint C, such as C=2. This one-dimensional bitstring operation is applied line-by-line as well as column-by-column to the two-dimensional bitmap of the input document. See FIGS. 1a–1c in the paper. The resulting intermediate bitmaps then are combined by a logical AND operation, to give the result illustrated in FIG. 1d in the paper. In order to remove small gaps in text lines, an additional nonlinear horizontal smoothing is carried out by means of the same CRLA but this time with higher C, as with $C_{sm}=30$, to give the result illustrated in FIG. 1e in the paper.

One desirable characteristic of page segmentation is robustness with respect to tilt or skew between the scanlines and the lines of text, because document scanners sometimes skew a sheet and because printed lines are not always perpendicular to the feed direction. Another desirable characteristic is low requirement for processing power, so that the page segmentation stage of the overall process can be fast, preferably less than a second or two per page, and so that it would not require particularly expensive computing equipment.

It is believed that many of the known page segmentation processes, including that discussed in Wahl, M., et al., need to assume that the printed page is made primarily of rectangular blocks with sides parallel to the paper edges. Of course, this assumption may not be valid when the page is skewed relative to the scanline direction or when the print lines on the paper are skewed relative to the edges of the paper. There are discussions in the literature of accounting for skewing, e.g., by pre-processing to derive a skew correction and taking this correction into account in subsequent processing, or by using a Hough transformation. See Baird, H., et al., IMAGE SEGMENTATION BY SHAPE-DIRECTED COVERS, IEEE Proc. 10th ICPR, Atlantic City, N.J., pp 820–825, June 1990 and Hinds, S. C., et al., A DOCUMENT SKEW DETECTION METHOD USING RUN LENGTH ENCODING AND THE HOUGH TRANSFORMATION, IEEE Proc. 10th ICPR, Atlantic City, N.J., pp 464–468, June 1990. (Neither of these two papers is necessarily prior art to this invention.) However, such pre-processing can be time consuming and expensive.

Accordingly, an object of the invention is to achieve page segmentation and/or block classification which overcomes or at least reduces the limitations and disadvantages of proposals of the type referred to above, and to achieve this result through a process that is robust with respect to skew and at the same time is fast and does not require excessive computing power.

In order to achieve fast and economical page segmentation, the invention makes use of the recognition that from a distance text areas on a page tend to look grey and this general property could be used to distinguish quickly between text and blank areas on the page. The invention makes use of additional criteria for rapid and economical discrimination between text areas and other areas that also could look grey from a distance, such as some halftone and graphs.

In order to join coherent intervals or areas, known earlier proposals such as that discussed in Wahl, M., et al. have relied on the assumption of a rectangular structure, thus making the techniques sensitive to tilt or skew. The preferred embodiment of this invention uses graph connecting exemplified by the line adjacency graph (LAG) technique discussed earlier but modified in accordance with the invention to join grey intervals of scan lines into grey areas and to join grey areas that should be joined. See, e.g., the publication by the named inventor Pavlidis, T., A VECTORIZER AND FEATURE EXTRACTOR FOR DOCUMENT RECOGNITION, Computer Vision, Graphics, and Image Processing 35, 111–127 (1986). As used in a preferred embodiment of the invention, the nodes of the LAG correspond to grey intervals and the edges of the LAG join nodes in adjacent scanlines when the corresponding grey intervals of the scanlines would overlap if the two scanlines were overplayed on each other. Then, graph traversal, preferably but not necessarily breadth first graph traversal, is used to construct grey areas. See, also, the references cited at pages 126–7 of the named inventor's article.

The information resulting from page segmentation can be used in processes such as character recognition, e.g., as discussed in Kahan, S., et al., ON THE RECOGNITION OF PRINTED CHARACTERS OF ANY FONT AND SIZE, IEEE Transactions on Pattern Analysis and Machine Intelligence, Vol. PAMI-9, No. 2, Mar. 1987, pp. 274–288. See, also, the references cited at page 287 of the paper.

In a particular embodiment, the invention makes use of the recognition that after a document is digitized into a bitmap, using for example line scanning and bi-level digitization, the grey areas of interest tend to be characterized by closely spaced short black intervals along the respective scanlines. To discriminate grey areas that are likely to be text from those that are likely to be halftone, the invention makes use of properties such as whether correlation between scanlines varies with distance between scanlines. Such correlation tends to decrease with distance between scanlines in text but to remain relatively constant in halftone.

An exemplary and non-limiting process in accordance with the invention can be implemented by scanning a document along scanlines to detect "black" and "white" segments along the respective scanlines, where black and white can be defined with respect to a selected threshold. These black and white segments along a scanline are examined to detect "grey intervals" which can be defined as intervals that are between long white intervals or between a long white interval and an edge of the document. A long white interval can be defined as a white run length of over a certain size. Alternately, a long white interval can be defined as a sequence of white run lengths separated from each other by very short black run lengths, where "very short" can be defined in absolute terms (e.g., a black run length of a pixel or two) or in relative terms (e.g., a black run length that is a small percentage, such as a few percent of the preceding and/or succeeding white run length). A grey interval can be made up of closely spaced black run lengths that are short or long or it could be only a single black run length. A scanline through a character tends to produce such a grey interval. The grey intervals of scanlines can be associated with each other in the scan direction as well as in a direction transverse to the scanline direction (cross-scan direction) to identify "grey areas" defined as areas in which grey intervals are closely spaced. If the scanlines are horizontal, a process embodying the invention can find grey intervals along the respective scanlines and then associate grey intervals into grey areas using the modified LAG followed by graph traversal as earlier discussed. The scanlines used for page segmentation in accordance with the invention need not be as close to each other as those typically used for character recognition. The process can be speeded up considerably by using only every n—th, e.g., every 10—th, of the scanlines used for character recognition. Grey areas that are more likely to be text than, say, halftone, can be identified in accordance with the invention by testing the relationship between correlation of scanlines and distance between scanlines. Earlier known applications of the LAG are believed to have used the "depth first traversal" technique. A preferred embodiment of the invention uses a "breadth first traversal" at this stage of implementing the overall invented process.

Page segmentation in accordance with the invention is believed to be significantly more robust with respect to skew as compared with known prior processes that assume the absence of skew, and is believed to be considerably faster than known prior processes that pre-correct for skew. It is believed that a process in accordance with the invention could typically do page segmentation within about 2 seconds per page using equipment with the computing power of a current generation SPARC workstation.

BRIEF DESCRIPTION OF THE INVENTION

DETAILED DESCRIPTION

Figure 1:
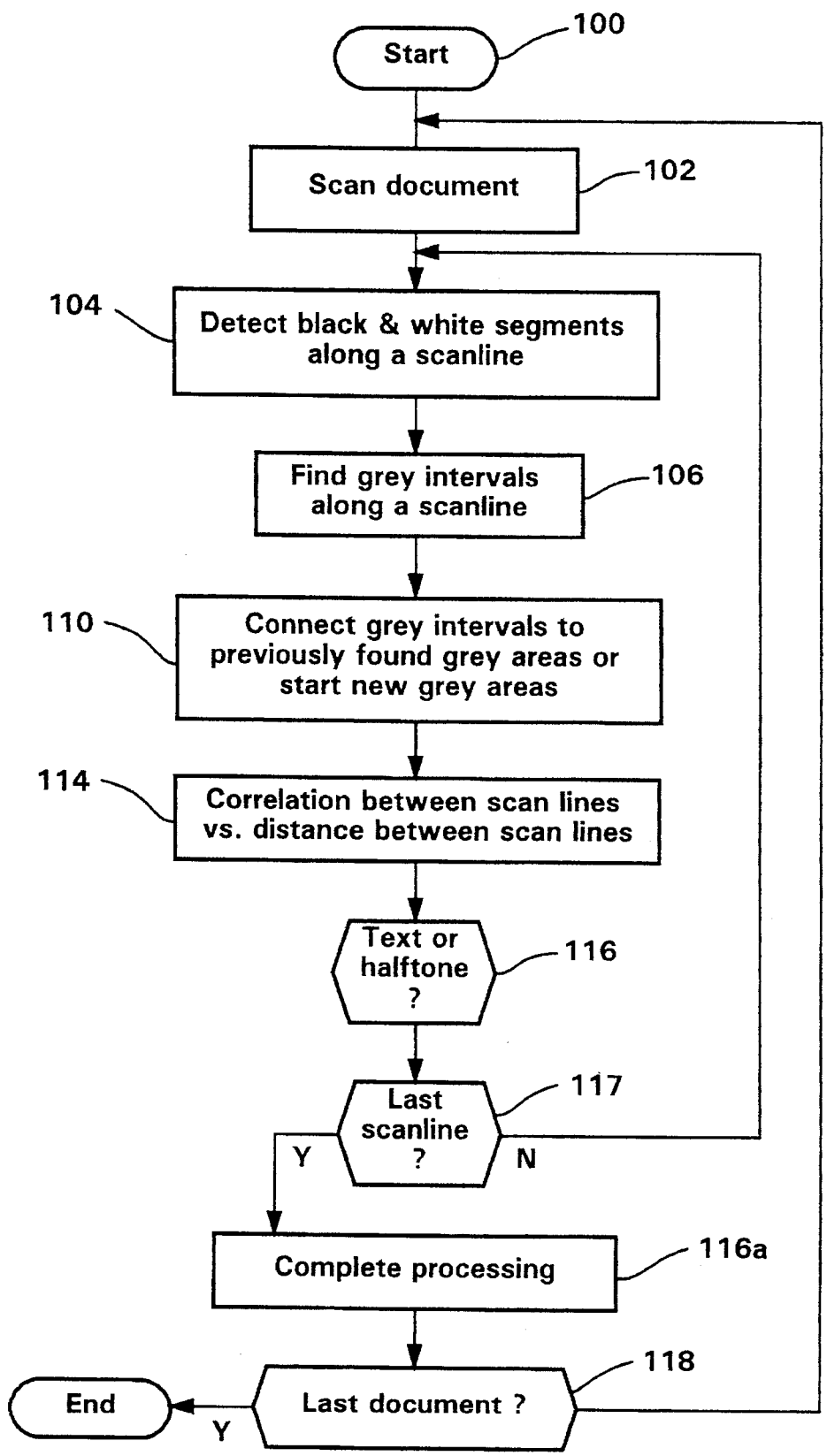
FIG. 1 is a generalized flowchart of a process in accordance with the invention.

Referring to FIG. 1, an exemplary and non-limiting embodiment of the invention starts at step 100 and at step 102 scans a document such as a page that may contain text as well as other subject matter such as halftone and/or graphs. Step 102 can use a commercially available scanner such as a scanner tradenamed RICOH 100; alternatively, the scanner can be of the type used in commercially available facsimile machines such as a machine tradenamed RICOH RF-920. Typically, such scanners scan a line in a main scanning direction while feeding a sheet of paper in a sub-scan direction. Typically, if the scanlines are generally horizontal, the paper is fed (or the scanner moves relative to a stationary sheet of paper) generally vertically. In this specification, scanlines will be referred to as horizontal, but it should be understood that this is only one example of scanning, and that the scanlines can be skewed with respect to the text and with respect to the edges of the document. Similarly, the cross-scan or sub-scan direction will be referred to as vertical, but it should be understood that this is only an example and that it need not be at a right angle to the scanlines or to any edge of the document. The scanner digitizes the information on the paper typically through a bi-level digitization in which an elemental picture element (pixel) is classified as black or white depending on how its reflectivity compares with a threshold value or digitizes (binarizes) the information using any of the many other known techniques. The result of scanning a line is a one-dimensional string of 1's and 0's representing black and white pixels (or white and black pixels). The scanlines can be close to each other, at several hundred lines per inch, although the invented page segmentation process can work at a scanline density that is much less than that, e.g., a tenth of that.

At step 104, the process detects black and white segments along a scanline. These segments are similar to the run lengths in facsimile machines, e.g., in CCITT Group 3 machines such as the machine referred to above. The run lengths can be expressed as strings of 1's and strings of 0's, or they can be expressed as counts of successive 1's and counts of successive 0's (as used before the Huffman coding step in CCITT).

At step 106, the process finds grey intervals which are defined as intervals that are between long white intervals. As earlier noted, the long white intervals can be defined as white (or mostly white) run lengths longer than a selected threshold and could correspond to, e.g., the white intervals between characters, although this is not a limitation of the invention. The grey intervals could be intervals of closely spaced, short or long black segments or can be continuous black segments. The considerations which go into defining what should be identifed as a long white interval (and, therefore, what should be identified as a grey interval, i.e., any interval between two white long white intervals or between an edge of the document and a long white interval), are related to the nature of text and are exemplified in the detailed description of a preferred embodiment below.

At step 110, grey areas are found in accordance with the invention by connecting grey intervals in a manner similar to LAG and then using breadth first graph traversal to connect grey intervals to or into grey areas. This step connects grey intervals to previously started blocks of grey intervals (called grey areas) or starts new such blocks or connects already started blocks in a process which is a type of breadth first graph traversal and is characterized in that it connects grey rather than black intervals.

At step 114, the process makes use of the recognition that significant information is offered by the value of the scanline correlation "C(h)" between two scanlines which are "h" distance apart. The correlation between two scanlines can be defined as the sum of the lengths of places where the scanlines have the same color (black or white) minus the sum of the lengths at the places where they differ in color. If the scanlines are stored as bitmaps rather than run lengths, then the correlation would be the number of ZERO bits minus the number of ONE bits in a scanline produced by an EXCLUSIVE-OR operation between the two relevant scanlines. If two scanlines have identical and identically distributed run lengths, then the correlation is the length "L" of the scanlines. If two scanlines are identical over length "L-K" (but disagree over length "K"), then their correlation is C(h)=L-2K. An exactly opposite arrangement in two scanlines would yield C(h)=-L. The value of C(h) for scanlines that are close to each other tends to be high for text areas but low for halftone areas. For example, the average value of the correlation C(h) can be above 0.9 for closely spaced scanlines through text, approaching 0.99 for short lines, and can be less than 0.9 for halftone. However, if halftone contains large areas of one color, with very few spots of another color, such areas could yield high correlation values similar to those for text. To take this into account, the process embodying the invention looks at the value of the correlation C(h) for different values of "h." For text areas, C(h) tends to be a decreasing function of "h" while for halftones the value of C(h) tends to be independent of "h," especially in large areas of uniform color.

The difference in the behavior of the correlation function in text versus halftone can be explained by considering two simple examples. One is a textline consisting of the character "H" and the other is a uniform halftone area produced by ordered dither. In the first case, if two scanlines intersect only the vertical strokes of the H characters, their correlation would be 1. If one scanline intersects only the vertical strokes but another intersects the bars of the H characters, their correlation would be negative. If the two scanlines are very close, the values "h" where the correlation is negative will be very few. Where there are many characters in a text-line, it is unlikely that they would line up so the correlation will be high. In the case of halftone produced by ordered dither, the elements of the dithering matrix are chosen deliberately so as to be uncorrelated so adjacent scanlines will tend to have a low correlation. Because the dither pattern repeats itself, scanlines that are far apart may exhibit high correlation. While these two simple examples describe idealized cases, empirical measurements on actual digitized documents have confirmed the overall trends discussed above. Note that theoretically the correlation function depends not only on "h" but also on the position "y" of the scanlines themselves, and it would be more complete to express the correlation as "C(y, y+h)," where "y" is the position of the first scanline of a pair of scanlines being correlated. However, in practice the dependence on "y" tends to be very small because of the overall uniformity of text and halftone.

Step 116 identifies grey areas as text or, e.g., halftone, based on the information from step 114 giving the value of the correlation C(h) and the way that value changes with "h." Step 116a completes the processing, performing housekeeping tasks scuh as dealing with the parameters of identified text areas. If the test at step 117 shows that this is not the last scanline, the process returns to step 104; otherwise it goes to step 118. If the test at step 118 shows that the document being considered is not the last document, the process returns to step 102 to start scanning the next document; otherwise, the page segmentation process ends and the results can be supplied to a subsequent process such as a character recognition process that can be applied only to the grey areas that have been identified as text areas.

Figure 2:
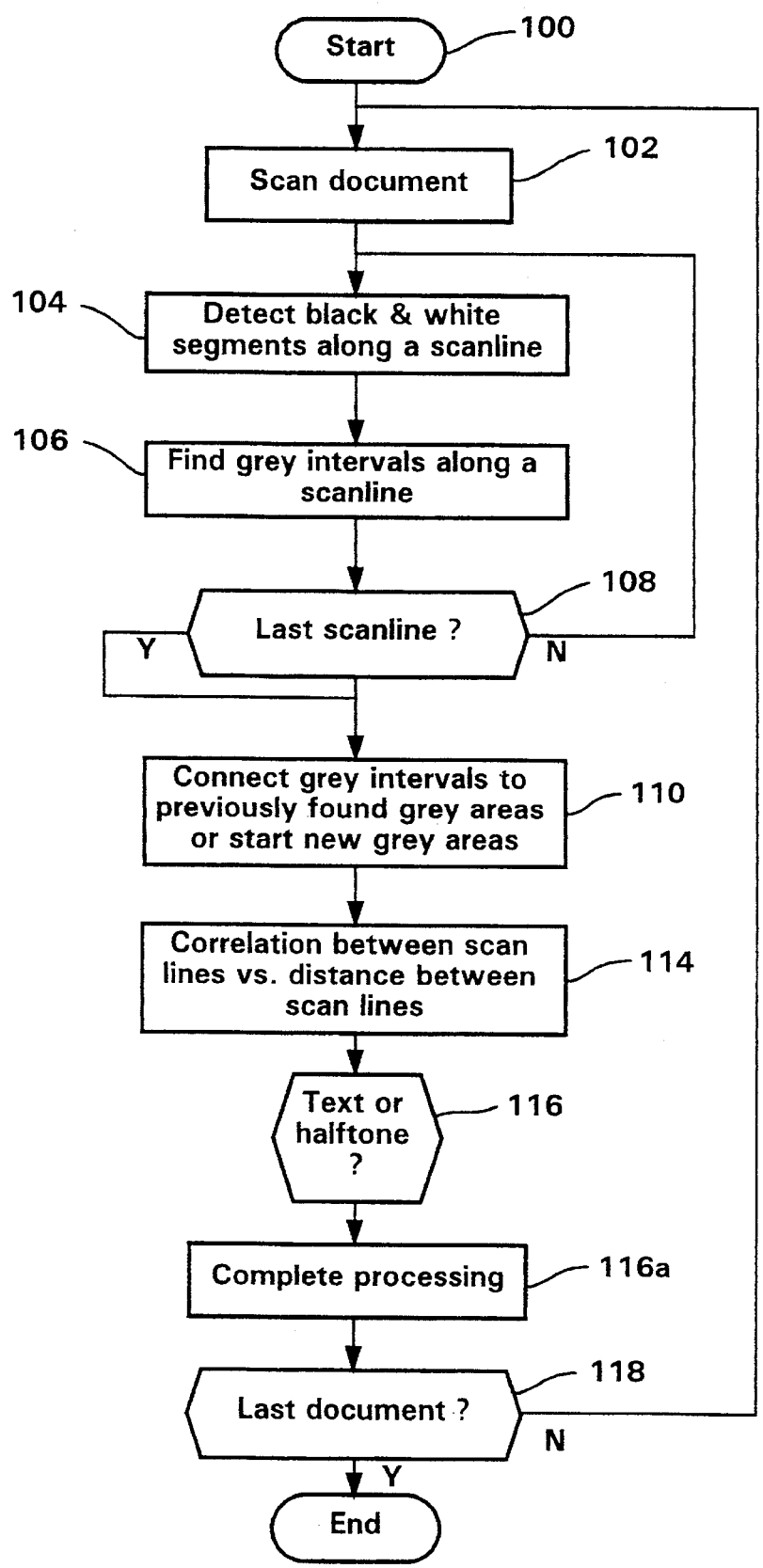
FIG. 2 is a generalized flowchart of an alternate implementation.

FIG. 2 illustrates an alternate embodiment in which the steps that correspond to those discussed above have like reference numerals. The main difference between the processes of FIGS. 1 and 2 is that in FIG. 2 a check at step 108 returns the process to step 104 at the end of every scanline until the last, so that the process at step 110 of finding grey areas starts only after all the grey intervals have been found. Of course, for this reason there is no step 117 in the process of FIG. 2. This embodiment is particularly suitable for applying a depth first graph traversal of the LAG.

Figure 3:
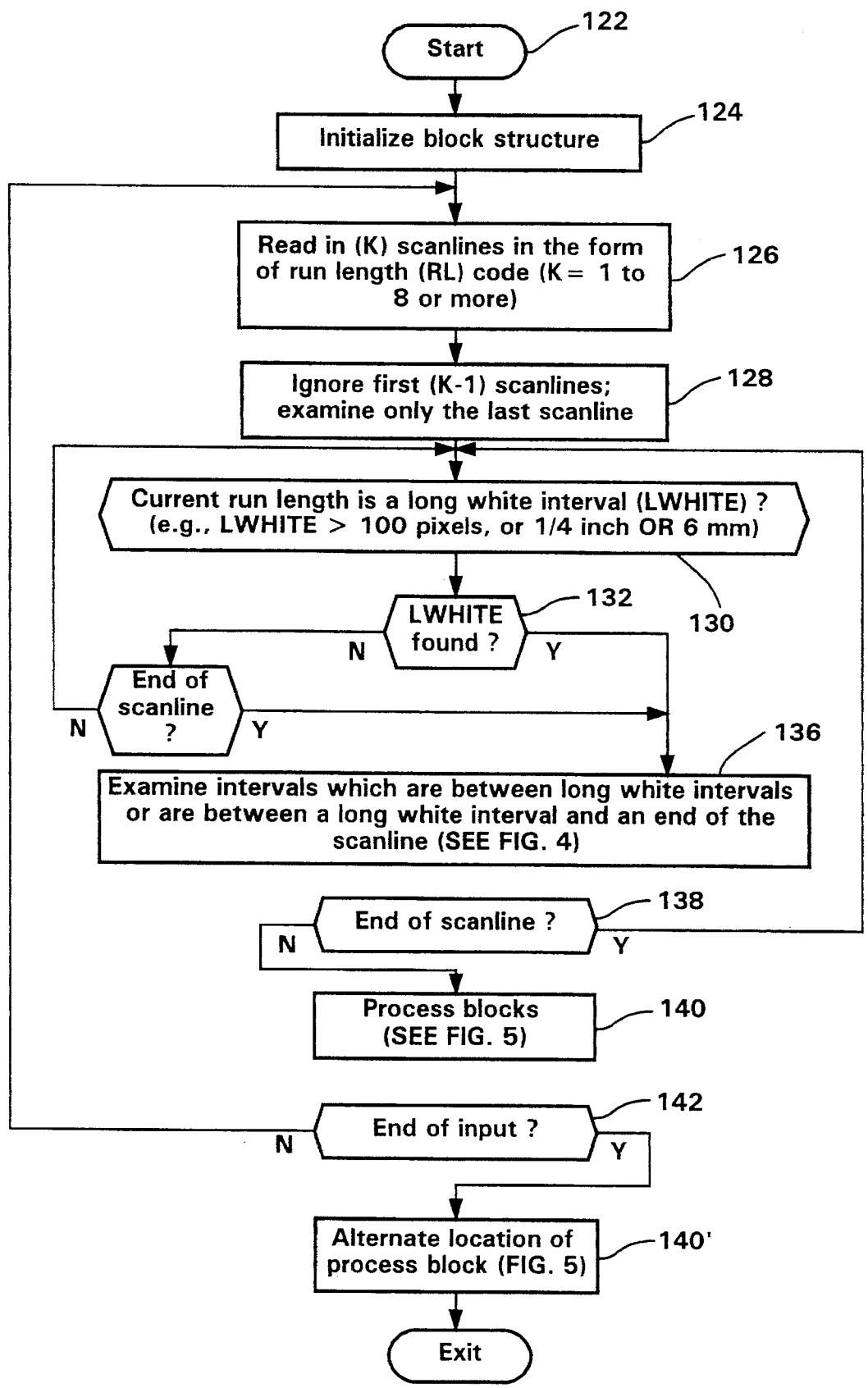
FIGS. 3–6 are more detailed flowcharts of the process illustrated in FIG. 1.

Referring to FIGS. 3-6 for a more detailed description of a process embodying a non-limiting example of the invention, the process starts at step 122 and initializes a block structure at step 124. At step 126, the process reads in (K) digitized adjacent scanlines, where K=1 to 8 or more. The (K) scanlines are supplied from a source such as a scanner or a bitmap memory, and the scanlines are supplied to step 126 in the form of run length (RL) code. At step 128, the process ignores the first (K−1) scanlines (assuming K>1) and examines only the last scanline, thereby reducing processing time as compared with examining every scanline. At step 130 the process looks for long white intervals in the current scanline, i.e., for white intervals (strings of 0's) longer than a parameter "lwhite" which can be set to a value such as 100 pixels (or approximately ¼ inch or 6 mm) or, as earlier noted, for mostly white intervals. If the test at step 132 determines that no such interval has been found and the test at step 134 determines that the end of the scanline has not been reached, the process returns to step 130. When the test at 132 determines that a long white interval has been found, or the test at 134 determines that the process has reached the end of the current scanline, the process goes to step 136 to examine the found interval between the previously found long white interval (or the start of the scanline) and the current position in the scanline. An example that would give a YES from step 132 is a scanline interval between the left margin of a newspaper page (the previous long white interval) and the space between columns 1 and 2. Such an interval is likely to be a grey interval and is called a "potentially" grey interval in this specification. The purpose of step 136 is to see if the potentially grey interval is in fact a grey interval and, if so, to attempt to add it to a block (representing a grey area) that has been initialized or to start a new block with that grey interval. The process carried out at step 136 of FIG. 3 is illustrated in greater detail in FIG. 4 and is discussed in connection therewith below. Returning to FIG. 3, following the processing of a potential grey interval at step 136, step 138 checks if the process has reached the end of the scanline. If the answer is YES, the process returns to step 130 to start processing another scanline; if the answer is NO, step 140 processes the blocks of interest as illustrated in more detail in FIG. 5 and discussed in connection therewith. Next, step 142 checks if the end of input has been reached. If the answer is NO, the process returns to step 126 to read in another (K) scanlines in; if the answer is Yes, the process exits, and can either record the page segmentation results or display them or enter into another stage of the overall process such as a character recognition. Instead of being between steps 138 and 142, step 140 could be at the location denominated 140'.

Figure 4:
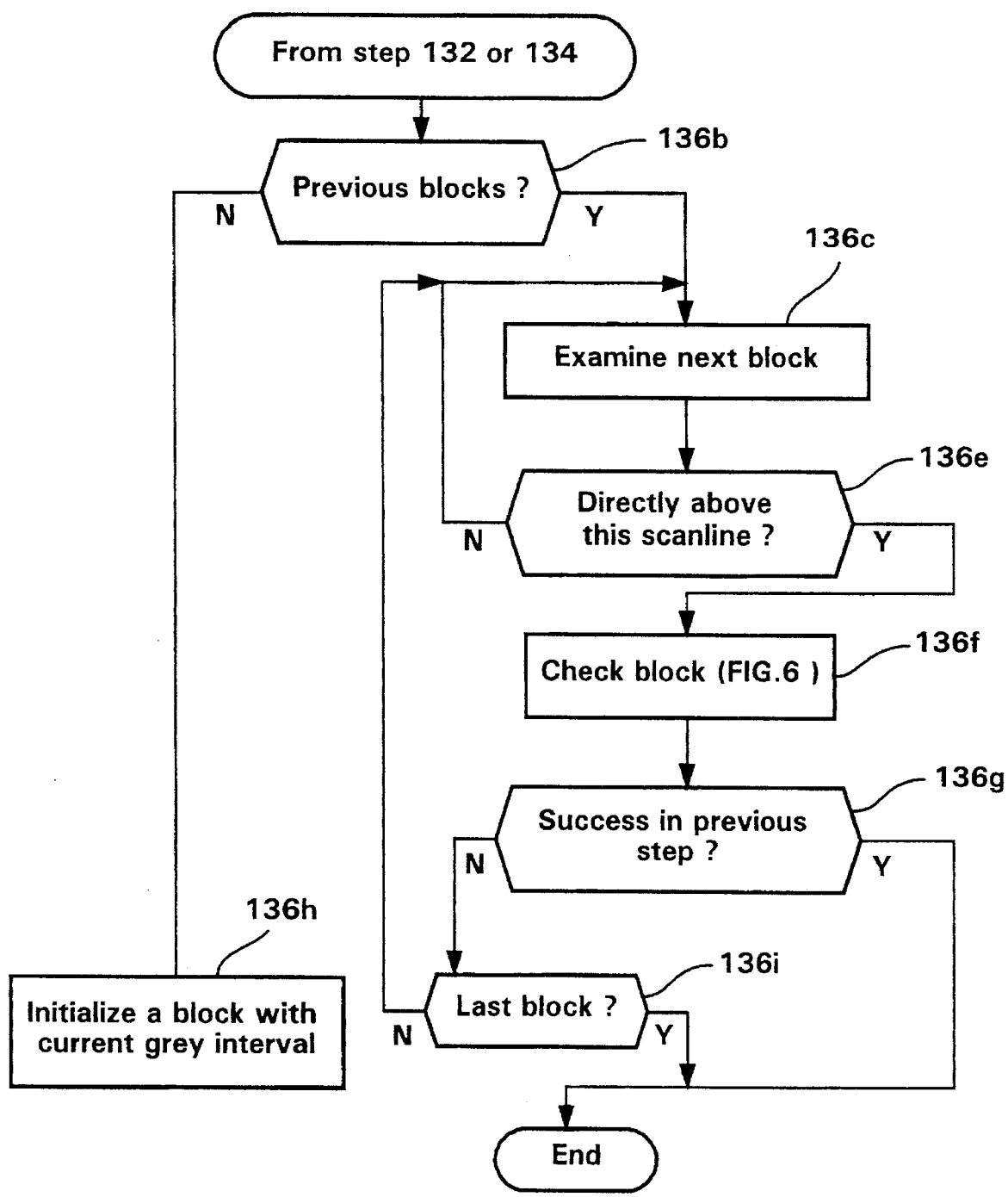

Referring to FIG. 4, if the test at step 136b shows that no blocks have been started (i.e., no grey areas have been identified yet), the process goes to step 136h to initialize a block with the current grey interval. If step 136b show that at least one block has been started, the process goes to step 136c to examine the previously found blocks in sequence (starting with the first block) to see if the current grey interval should be added to one of these previously found blocks. If step 136e determines that the block is not vertically directly above the current grey interval, the process returns to step 136c to examine the next block. If step 136e determines that the block being examined is vertically directly above the current grey interval, step 136f checks the block and, if appropriate, adds the current grey interval to the block, as illustrated in more detail in FIG. 6 and discussed in connection therewith. If step 136g determines that the current grey interval could not be added to the block, the process goes to step 136i to check if there are any remaining blocks. If there are, the process goes to step 136c to examine the next block; otherwise the process of this Figure ends and returns to step 138 of FIG. 3. If the answer at step 136g is YES, the process of FIG. 4 ends and the overall process returns to step 138 of FIG. 3.

Figure 5:
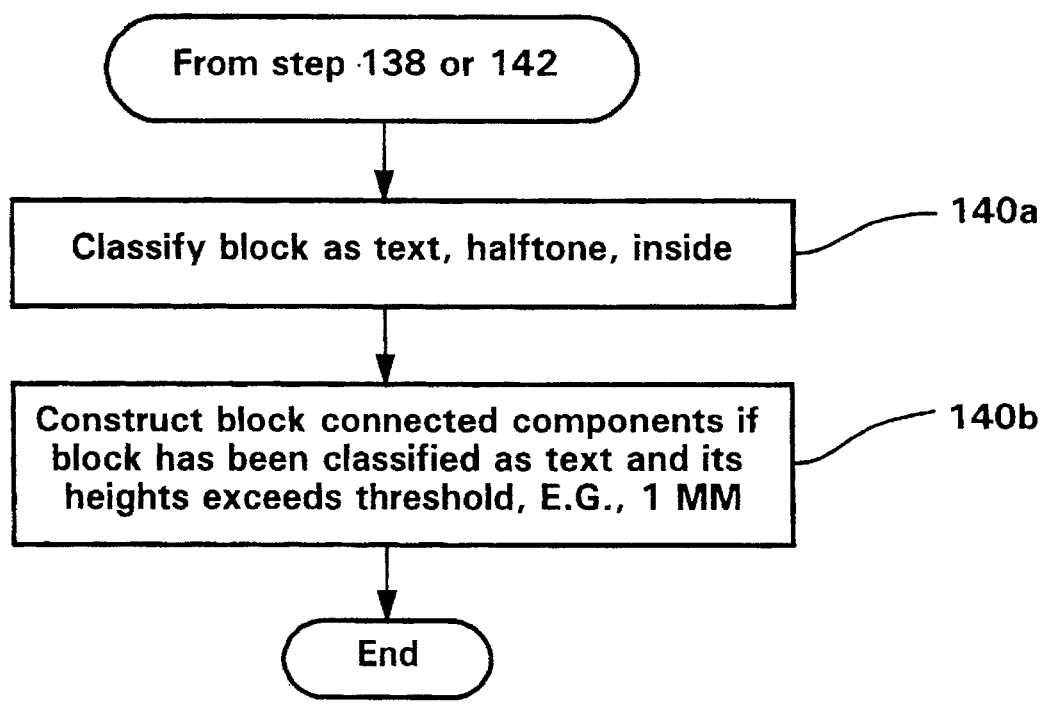
Figure 7:
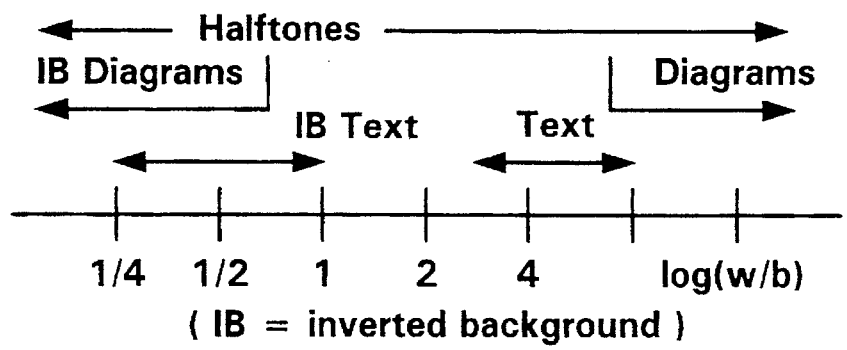
FIG. 7 illustrates criteria for discriminating between character text and graphs.

FIG. 5 illustrates step 140 (or 140a) of FIG. 3. In FIG. 5, step 140a classifies a block (i.e., a grey area) as text or halftone on the basis of calculating the correlation C(h) as a function of the distance between scanlines as discussed earlier. In addition, step 140a checks if the boundaries of a current block are inside the boundaries of another block; if they are, the inside block is eliminated because it is likely that it is only a texlike area of halftone. Step 140 attempts to connect blocks which have been classified as text and are taller than some threshold such as 1 mm. The connecting at this stage can be done using a version of the known LAG technique of the type referred to in the background part of this specification. The process then calculated parameters such as the location of the boundaries of the resulting block structure, for use in subsequent stages of the overall process. In addition, if the term "text" is used to refer to structured information that can be character text (e.g., Roman or Kanji characters) or diagrams (e.g., a floor plan), character text can be separated from diagrams on the basis of the ratio of white over black run lengths in the "text" area, for example by using the criteria illustrated in FIG. 7. Diagrams tend to be far sparser than character text so that, as seen in FIG. 7, the ratio of total length of white runs "w" to total length of black runs "b" is large (low for inverted background documents). However, such a process is suitable only as a pre-processing step; the ultimate separation can be done with great accuracy only in conjunction with a character recognition process, because very large characters as used in titles could exhibit relevant statistics similar to those of small diagrams.

Figure 6:
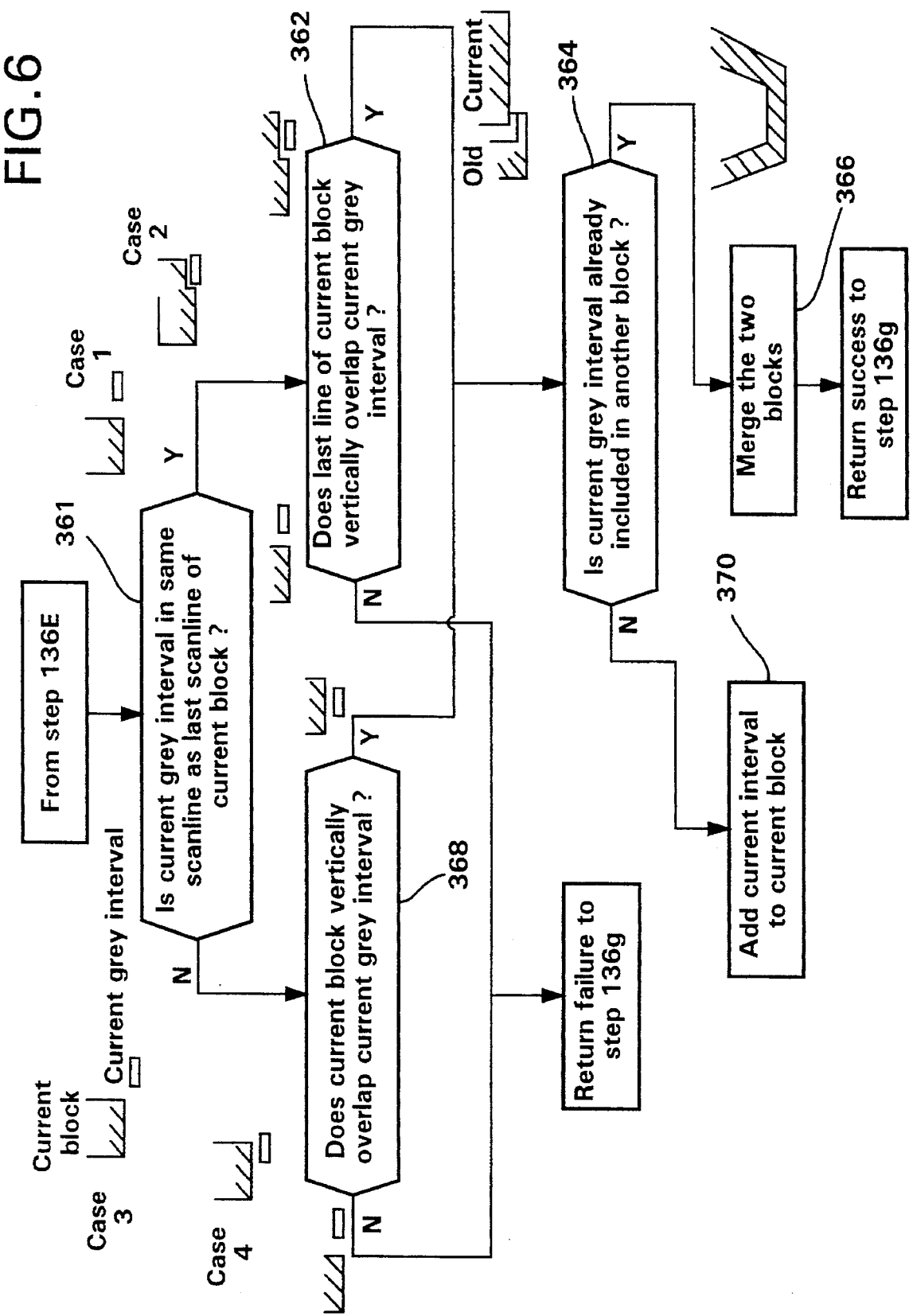

FIG. 6 illustrates step 136g of FIG. 3, in which an attempt is made to add a current grey interval of a scanline to a block. In FIG. 6, step 361 checks if the current grey interval is in the same scanline as the last scanline of the current block. The two possible YES cases are illustrated to the right of step 361 as case 1 and case 2. A YES answer from step 361 leads to a test at step 362 to determine which of cases 1 and 2 is present, i.e., to test if the previous scan line in the current grey interval overlaps the current grey interval (case 2) or does not (case 1). A YES answer at step 362 leads to step 364 to test if the current grey interval is already included in another block (a case illustrated in the sketch to the right of step 364). A YES answer at step 364 leads to step 366 at which the last and the current blocks are merged. If the answer at step 361 is NO (i.e., as in case 3 and case 4 sketched to the left of step 361), step 368 checks if the current grey interval is vertically overlapped by the last scanline of the current block (i.e., if we have case 3 or case 4). A YES answer at step 368 (i.e., case 4) leads to step 364; a NO answer (i.e., case 3) leads to an indication to step 136g in FIG. 4 to take the NO (failure to connect) branch to step 136h. A NO answer at step 364 in FIG. 6 leads to step 370, at which the current grey interval is added to the current block and the process returns with a success indication to step 136g in FIG. 4.

I claim:

1. An image characteristic identifying method comprising the steps of:

a data inputting step comprising scanning a document along scanlines parallel to a main scanning direction;

a digitizing step comprising digitizing said scanlines through a bi-level digitization in which a pixel is classified as black or white depending on how its reflectivity compares with a threshold value, and storing said scanlines as bitmaps or run lengths;

a detecting step comprising detecting black and white segments along said scanlines;

a first linking step comprising linking to each other black segments which are adjacent to each other along a scanline and linking to each other white segments which are adjacent to each other along a scanline;

a finding step comprising finding grey intervals along the respective scanlines, wherein each of said grey intervals is bound along a scanline on one side by a relatively long white segment and on the other side either by another relatively long white segment or by an edge of the document, and each of said grey interval comprises either a black segment or a sequence of alternating black and white segments in which adjacent black segments are spaced along a scanline by a relatively short white segment;

a second linking step comprising linking to each other adjacent grey intervals into areas of grey intervals where each area of grey intervals comprises grey intervals along a number of scanlines;

a storing step comprising storing the positions of said areas of grey intervals and the positions of the black segments and white segments within said areas of grey intervals; and an identifying step comprising identifying such areas of grey intervals on the document as text areas or halftone areas to thereby segment the document into areas which are text and areas which are halftone.

2. A process as in claim 1 in which said identifying step comprises identifying as text areas those areas of grey intervals in which the correlation between the two scanlines of a pair of scanlines tends to decrease with distance between the scanlines making up the pair.

3. A process as in claim 2 in which said identifying step comprises identifying as halftone areas those areas of grey intervals in which the correlation between the two scanlines of a pair of scanlines tends to be independent of distance between scanlines making up the pair.

4. A process as in claim 1 in which said second linking step comprises linking grey intervals in a breadth first traversal process in which first grey intervals are linked along the breadth of the document and then along the length of the document.

5. A process as in claim 1 in which said second linking step comprises linking grey intervals in a direction transverse to the main scanning direction to form said grey areas.

6. A process as in claim 1 including the step of applying a character recognition process to the text areas identified in said identifying step.

7. A process as in claim 1 including the step of processing text areas identified in said identifying step to distinguish between text areas that are likely to be areas of characters and text areas that are likely to be areas of diagrams.

8. A process as in claim 7 in which said processing step to distinguish between text areas comprises using a ratio of white run lengths to black run lengths as a distinguishing parameter.

* * * * *